(12) United States Patent
Kinugawa et al.

(10) Patent No.: US 7,764,254 B2
(45) Date of Patent: Jul. 27, 2010

(54) ELECTRO-OPTICAL DEVICE AND ELECTRONIC APPARATUS

(75) Inventors: Tomokatsu Kinugawa, Matsumoto (JP); Kazuki Imai, Okaya (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 64 days.

(21) Appl. No.: 12/179,256

(22) Filed: Jul. 24, 2008

(65) Prior Publication Data

US 2009/0059341 A1    Mar. 5, 2009

(30) Foreign Application Priority Data

Aug. 29, 2007  (JP) .............. 2007-222212
May 13, 2008  (JP) .............. 2008-125572

(51) Int. Cl.
  G09G 3/36     (2006.01)
  G02F 1/1335   (2006.01)
  G02F 1/1343   (2006.01)

(52) U.S. Cl. .............. 345/87; 345/88; 349/61; 349/44

(58) Field of Classification Search ........... 345/87, 345/88, 89, 92; 349/11, 39, 42, 61, 62, 106, 349/144
See application file for complete search history.

(56) References Cited

U.S. PATENT DOCUMENTS

| 5,323,477 | A | 6/1994 | Lebby et al. |
| 5,610,739 | A * | 3/1997 | Uno et al. .............. 349/39 |
| 6,081,248 | A | 6/2000 | Hasegawa et al. |
| 6,683,726 | B2 | 1/2004 | Endo et al. |
| 7,415,688 | B2 | 8/2008 | Sakakibara |
| 7,502,039 | B2 | 3/2009 | Koyama et al. |

FOREIGN PATENT DOCUMENTS

| EP | 0 373 822 A2 | 6/1990 |
| JP | 2269315 A | 11/1990 |
| JP | 02-298916 A | 12/1990 |
| JP | 04-127140 A | 4/1992 |
| JP | 04-207773 A | 7/1992 |
| JP | 5045773 U | 6/1993 |
| JP | 6186494 A | 7/1994 |
| JP | 10097215 A | 4/1998 |
| JP | 11-067464 A | 3/1999 |
| JP | 2001-125541 A | 5/2001 |
| JP | 2002090694 A | 3/2002 |
| JP | 2002093202 A | 3/2002 |
| JP | 2003-344801 A | 12/2003 |
| JP | 2004-163774 A | 6/2004 |
| JP | 2004-198792 A | 7/2004 |
| JP | 2004-347930 A | 9/2004 |
| JP | 2007-086191 A | 4/2007 |

* cited by examiner

Primary Examiner—David N Spector
(74) Attorney, Agent, or Firm—Lowe Hauptman Ham & Berner, LLP (57) ABSTRACT

An electro-optical device includes a first sub pixel and a second sub pixel. A pixel is configured by the first sub pixel and the second sub pixel only, and the first sub pixel and the second sub pixel emit light of different colors.

13 Claims, 10 Drawing Sheets

Related Art

FIG. 11B

Related Art

FIG. 12

ELECTRO-OPTICAL DEVICE AND ELECTRONIC APPARATUS

The entire disclosure of Japanese Patent Application Nos. 2007-222212, filed Aug. 29, 2007 and 2008-125572, filed May 13, 2008 are expressly incorporated by reference herein.

BACKGROUND

1. Technical Field

The present invention relates to an electro-optical device capable of displaying various types of information in colors and an electronic apparatus having the electro-optical device.

2. Related Art

Figure 11A:
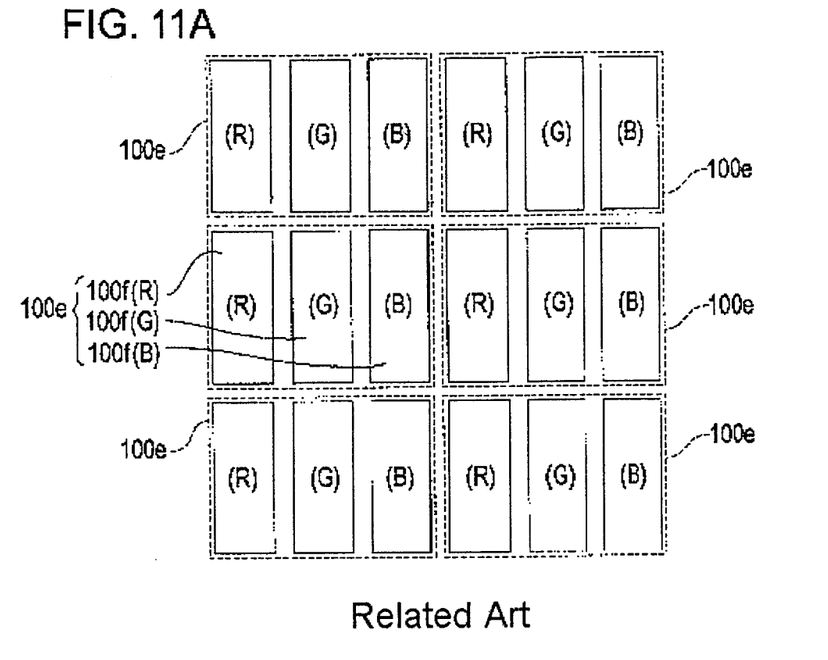
FIG. 11 is a diagram showing a two-dimensional arrangement of pixels (sub pixels) of a general electro-optical device.

In electro-optical devices such as liquid crystal devices and organic electro luminescence devices, a plurality of pixels is aligned in a predetermined direction. When color display is performed, for example, by using a liquid crystal device among these electro-optical devices, as shown in FIG. 1A, each of the plurality of pixels $100e$ is configured by three sub pixels $100f(R)$, $100f(G)$, and $100f(B)$ corresponding to red, green, and blue colors (see JP-A-H02-298916).

Figure 11B:
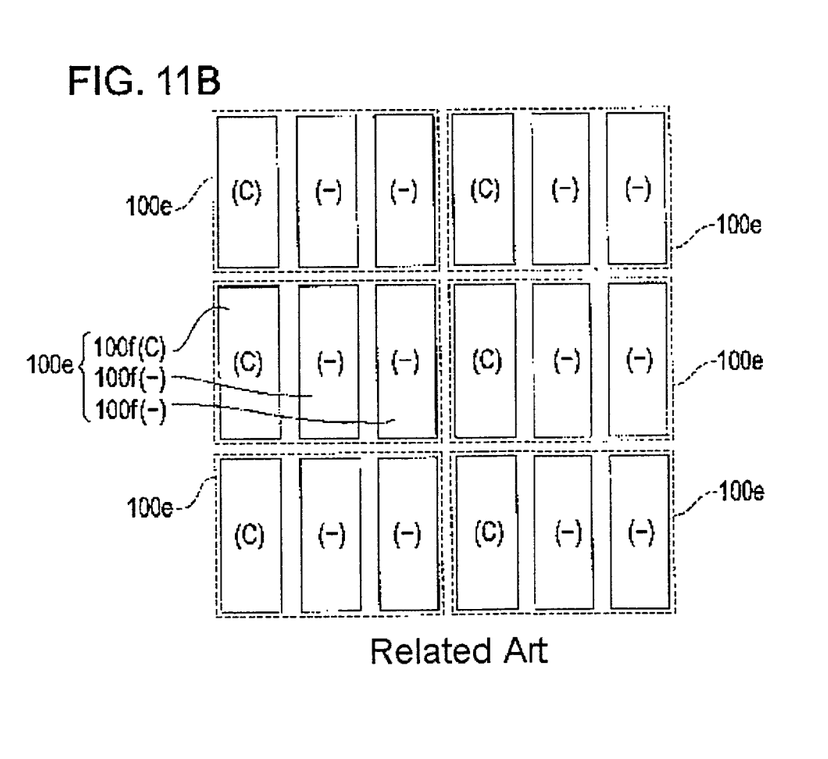

In addition, in order to draw a comment or a mark on an image in a medical display apparatus or the like, as shown in FIG. 11B, technology in which one sub pixel $100f(C)$ among the three sub pixels $100f$ configuring the pixel $100e$ is used for color display and two sub pixels $100f(-)$ are used for monochrome display has been proposed (see JP-A-2004-198792).

Recently, electro-optical devices are used in various types of electronic apparatuses such as direct-view type display apparatuses and projection-type display apparatuses. In addition, among the projection-type display apparatuses, a display apparatus that projects various images to be displayed on a windshield glass of a vehicle is called a head-up display (HUD). According to such a display apparatus, there is an advantage that a driver can visually recognize information without dropping his or her line of sight. A projection-type display apparatus is required to have a luminance level higher than that of a direct-view type display apparatus. In addition, the projection-type display apparatus is required to have a high ratio (pixel aperture ratio) of an area in which display light can be emitted to the whole sub pixel area.

However, within the sub pixel, a pixel switching element that is electrically connected to a pixel electrode and various wirings are configured as light shielding areas through which light is not transmitted. Since there is limitation on reducing the area occupied by the light shielding areas, there is a problem in general configurations that it is difficult to increase the pixel aperture ratio further.

SUMMARY

An advantage of some aspects of the invention is that it provides an electro-optical device capable of displaying various types of information with a high luminance level by configuring pixels in accordance with the type of display and an electronic apparatus having the electro-optical device.

According to a first aspect of the invention, there is provided an electro-optical device including: a first sub pixel; and a second sub pixel. In addition, a pixel is configured by the first sub pixel and the second sub pixel only, and the first sub pixel and the second sub pixel emit light of different colors.

According to this aspect of the invention, since one pixel is configured by two sub pixels including the first sub pixel and the second sub pixel, the ratio of an area occupied by thin film transistors and wirings to an area of the whole one pixel is smaller than that in a case where one pixel is configured by three sub pixels, and whereby the pixel aperture ratio is high. Therefore, according to this aspect, an image with a high luminance level can be displayed. In addition, since the first sub pixel and the second sub pixel emit light of different colors, information that is required for a head-up display or the like can be displayed in a different color. In addition, since the number of sub pixels configuring one pixel is two, the configuration of a line driving circuit that drives the electro-optical device can be more simplified than a configuration in which one pixel is configured by three sub pixels.

In the above-described electro-optical device, the first sub pixel and the second sub pixel may be configured as color sub pixels that emit colored light of different colors. In such a case, display in a total of three colors can be performed, and accordingly, a total of four different display states can be acquired. In the head-up display or the like, there are many cases that sub pixels of three colors including R (red), G (green), and B (blue) colors are not needed. Accordingly, for example, a method in which three sub pixels of a display panel which have been used for R, G, and B colors are used as two-color sub pixels of R, G, and G colors or R, R, and G colors may be considered to be used. However, as described above, it is advantageous that one pixel is configured by two sub pixels.

In the above-described electro-optical device, any one sub pixel of either the first sub pixel or the second sub pixel may be configured as a monochrome sub pixel that emits white light. In such a case, monochrome display can be performed, and a warning or the like can be displayed in a color.

In the above-described electro-optical device, the first sub pixel and the second sub pixel may be configured to have a same size.

In the above-described electro-optical device, the first sub pixel and the second sub pixel may be configured to have different sizes. In such a case, various types of information can be displayed to be easily viewed by adjusting the size of information in accordance with the content to be displayed.

In the above-described electro-optical device, when directions perpendicular to each other are set as a first direction and a second direction, it is preferable that a plurality of pixel arrays in which a plurality of the first sub pixels and a plurality of the second sub pixels are alternately disposed along the first direction is disposed, and in pixel arrays adjacent in the second direction, positions of the first sub pixel and the second sub pixel in the first direction are deviated from each other.

In the above-described electro-optical device, a component substrate in which the sub pixels are formed and an electro-optical material that is maintained in the component substrate may be included, and a color filter may be disposed in an area corresponding to at least one of the first sub pixel and the second sub pixel.

In the above-described electro-optical device, it is preferable that the first sub pixel and the second sub pixel are driven to have two gray scale levels. In such a case, since there are many cases that a plurality of gray scale levels is not needed in the head-up display or the like, the driving circuit can be more simplified by configuring the sub pixels to have two gray scale levels of on and off.

In the above-described electro-optical device, it is preferable that a back light is further included and light sources of the back light include a first light source that emits light of a same color as that of the first sub pixel and a second light source that emits light of a same color as that of the second sub pixel. In such a case, since the back light emits light of same colors as those of light emitted by the sub pixels, that is, the back light emits only light of colors that are needed, use efficiency of light is improved, and whereby bright display can be performed.

In the above-described electro-optical device, it is preferable that the first light source and the second light source are LEDs and the numbers of the first light sources to be turned on and the second light sources to be turned on are different from each other. In such a case, for example, when the first sub pixel of either of the first sub pixel and the second sub pixel is needed to be displayed brighter, the first sub pixel can be displayed bright by increasing the number of the first light sources to be turned on. In addition, it is preferable that the first light source and the second light source are LEDs and values of currents that flow through the first light source and the second light source are different from each other. In such a case, by controlling currents of the light sources to be turned on, instead of increasing or decreasing the number of the light sources, the brightness levels of the first light source and the second light source can be adjusted. In order to brighten the first sub pixel, the size of the first pixel may be configured to be larger than that of the second sub pixel. However, in such a case, a control operation by using the driving circuit is needed. On the contrary, according to the above-described configuration, the first sub pixel can be brightened by only controlling the light sources.

The above-described electro-optical devices may be used in a direct-view type display apparatus (electronic apparatus) such as a cellular phone, an electronic organizer, a viewfinder type POS terminal, or a touch panel. In addition, the above-described electro-optical devices may be used in a projection-type display apparatus (electronic apparatus) such as a head-up display. In such a case, the projection-type display apparatus is configured to have a light source that supplies light to the electro-optical device; and an optical system that projects display light that is formed by optically modulating the light emitted from the light source by using the electro-optical device toward a projection surface.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the present invention will be described with reference to the accompanying drawings. The following embodiments are liquid crystal devices of an active-matrix driving type as electro-optical devices to which the invention is applied. In descriptions below, an electro-optical device used in a head-up display (transmission-type display apparatus/electronic apparatus) will be focused. In the drawings referred to in the descriptions below, in order to represent layers and constituent members in sizes recognizable in the drawings, scales are changed for each of the layers and the constituent members. In addition, in the drawings referred to in the descriptions below, to a part corresponding to a red color, "(R)" is attached. In addition, "(G)" is attached to a part corresponding to a green color, and "(–)" is attached to a part that emits white light for monochrome display.

Basic Configuration of Head-Up Display

Figure 1:
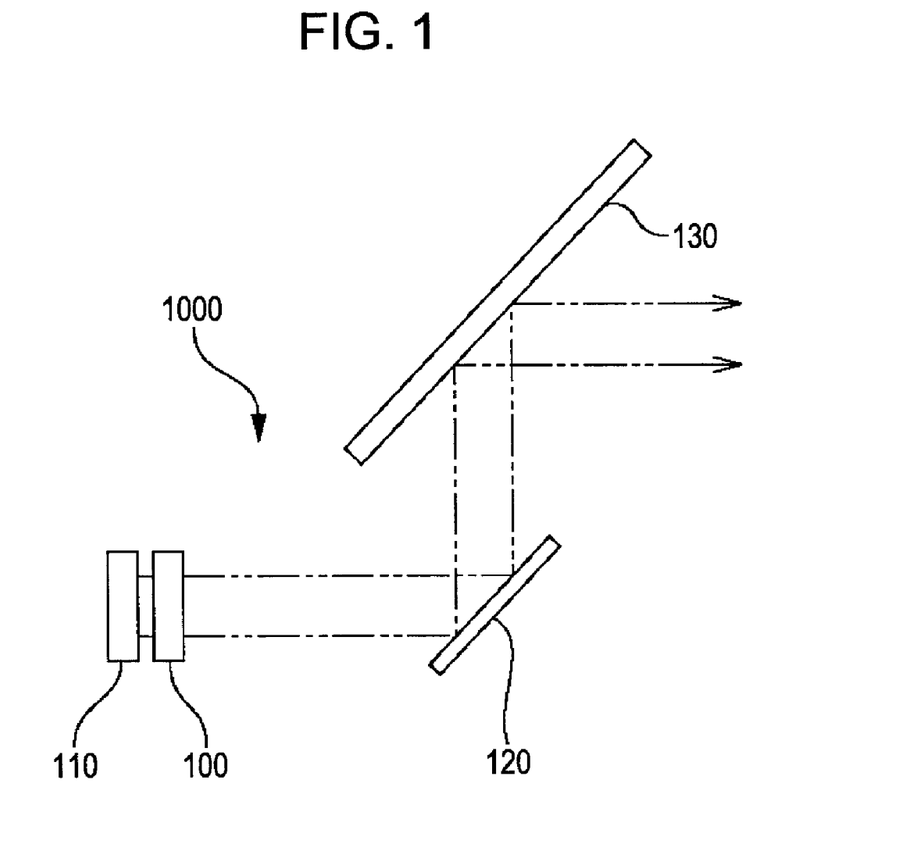
FIG. 1 is a schematic diagram showing the basic configuration of a head-up display as an example of an electronic apparatus on which an electro-optical device according to an embodiment of the invention is mounted.

FIG. 1 is a schematic diagram showing the basic configuration of a head-up display as an example of an electronic apparatus on which an electro-optical device according to an embodiment of the invention is mounted.

The head-up display 1000 as an electronic apparatus shown in FIG. 1 includes a back light device 110 using an LED, a cold cathode ray tube, an electroluminescence element, or the like, an electro-optical device 100 to be described later, and a mirror 120 serving as an optical system. The white light emitted from the back light device 110 is optically modulated by the electro-optical device 100 and is emitted as display light from the electro-optical device 100 toward the mirror 120. The display light reflected by the mirror 120 is projected onto a windshield glass 130 (a projection surface). The projection surface according to an embodiment of the invention is configured on a premise that display light is projected on a transparent screen such as a windshield glass. In other words, while a scene outside is visually recognized through the windshield glass, information projected onto the windshield glass is visually recognized.

The above-described head-up display 1000 performs simple navigation display, speed display, and the like. In such a case, sufficient information can be displayed using three colors. Accordingly, the head-up display 1000, different from an ordinary full-color display apparatus, has particularity that an image can be displayed by using a small number of kinds of colors.

The head-up display 1000 may be configured as a night vision apparatus. In such a case, the head-up display 1000 displays an image acquired by photographing a front side of a vehicle by using a night infrared camera or the like and gives a red-color warning inside the image in a case where a passenger or the like is recognized. In such use, the head-up display 1000, different from an ordinary full-color display apparatus, has a particularity that the head-up display needs to perform monochrome image display and red-color warning display only.

Thus, according to the invention, the electro-optical device 100 is configured as Embodiments 1 to 4, as described below. Although a transmission-type electro-optical device is shown in FIG. 1 as an example, a reflection-type electro-optical device may be used.

Embodiment 1

Whole Configuration

Figure 2:
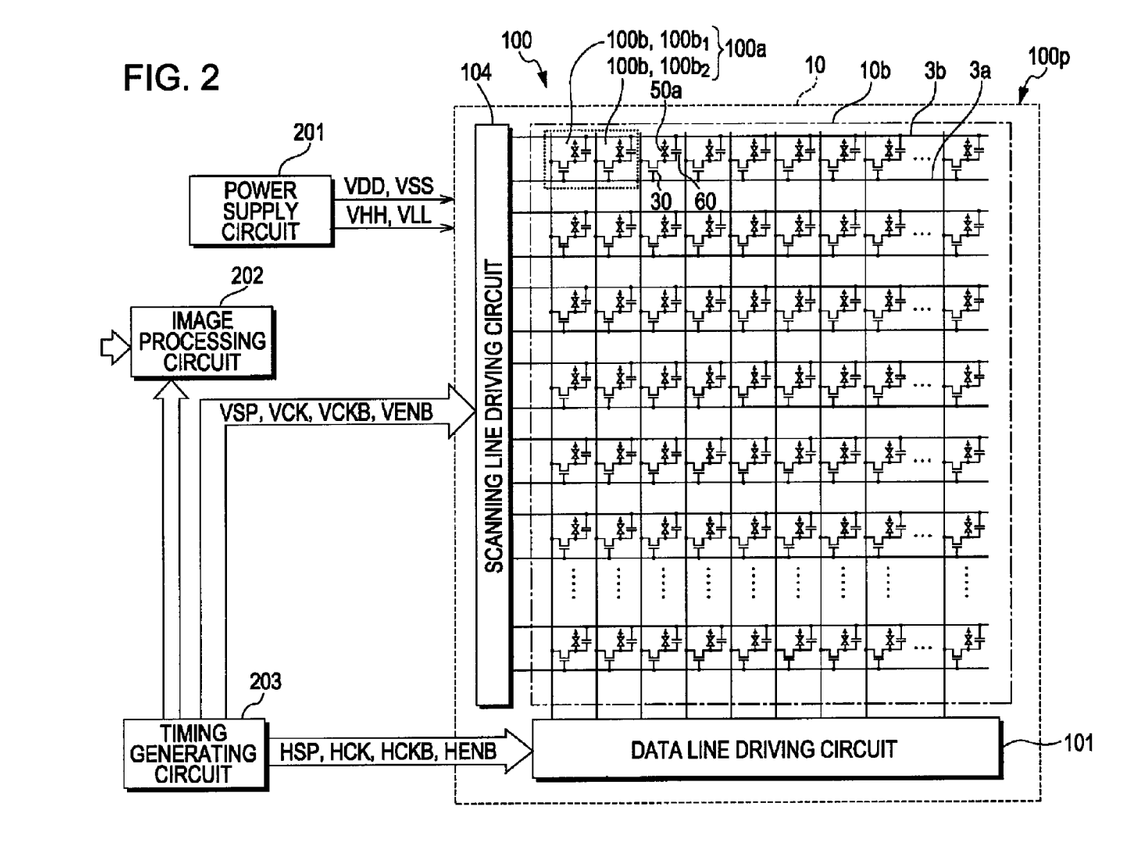
FIG. 2 is a block diagram showing the electrical configuration of an electro-optical device according to an embodiment of the invention.

FIG. 2 is a block diagram showing the electrical configuration of an electro-optical device according to an embodiment of the invention. As shown in FIG. 2, the electro-optical device 100 is configured mainly by a liquid crystal panel 100p, an image processing circuit 202, a timing generating circuit 203, and a power supply circuit 201. The image processing circuit 202, the timing generating circuit 203, and the power supply circuit 201 are configured by an IC or the like that is mounted on a flexible substrate (not shown) connected to the liquid crystal panel 100p. In the timing generating circuit 203, a dot clock used for driving pixels 100a (sub pixels 100b) of the liquid crystal panel 100p is generated. In addition, based on the dot clock, clock signals VCK and HCK, inverted clock signals VCKB and HCKB, and transfer stating pulses HSP and VSP are generated. When input image data is input from the outside, the image processing circuit 202 generates an image signal based on the input image data and supplies the image signal to the liquid crystal panel 100p. The power supply circuit 201 generates a plurality of power sources VDD, VSS, VHH, and VLL and supplies the plurality of power sources to the liquid crystal panel 100p.

The liquid crystal panel 100p has a pixel array area 10b, in which a plurality of pixels 100a is arranged in a matrix shape, in its center area. In a component substrate 10 of the liquid crystal panel 100p which will be described later, a plurality of data lines 6a and a plurality of scanning lines 3a extend in horizontal and vertical directions on the inner side of the pixel array area 10b, and sub pixels 100b are configured in positions corresponding to intersections thereof. In each one of the plurality of sub pixels 100b, a thin film transistor 30 as a pixel switching element and a pixel electrode 9a are formed to have one-to-one relationship. To a source of the thin film transistor 30, the data line 6a is electrically connected. In addition, the scanning line 3a is electrically connected to a gate of the thin film transistor 30, and the pixel electrode 9a is electrically connected to a drain of the thin film transistor 30.

To be described later in detail, in the electro-optical device 100 according to this embodiment, each of the plurality of pixels 100a is configured by two sub pixels 100b. In this embodiment, one sub pixel (a first sub pixel 100$b_1$) of the two sub pixels 100b is a color sub pixel that emits light of red color (R), and the other sub pixel (a second sub pixel 100$b_2$) is a color sub pixel that emits light of green color (G).

In the component substrate 10, in an area outside the pixel array area 10b, a scanning line driving circuit 104, and a data line driving circuit 101 are configured. The data line driving circuit 101 is electrically connected to one end of each data line 6a and sequentially supplies image signals supplied from the image processing circuit 202 to each data line 6a. In addition, the scanning line driving circuit 104 is electrically connected to each scanning line 3a and sequentially supplies scanning signals to each scanning line 3a.

In each pixel 100a, the pixel electrode 9a faces a common electrode, which is formed in an opposing substrate to be described later, with a liquid crystal interposed therebetween for configuring a liquid crystal capacitor 50a. In addition, in each sub pixel 100b, a hold capacitor 60 is added in parallel with the liquid crystal capacitor 50a so as to prevent leakage of an image signal maintained by the liquid crystal capacitor 50a. In this embodiment, in order to configure the hold capacitor 60, a capacitor line 3b is formed in parallel with the scanning line 3a, and the capacitor line 3b is connected to a common electric potential line (not shown) so as to maintain a predetermined electric potential. The hold capacitor 60 may be formed between the scanning lines 3a positioned in the front end.

Configuration of Liquid Crystal Panel and Component Substrate

Figure 3A:
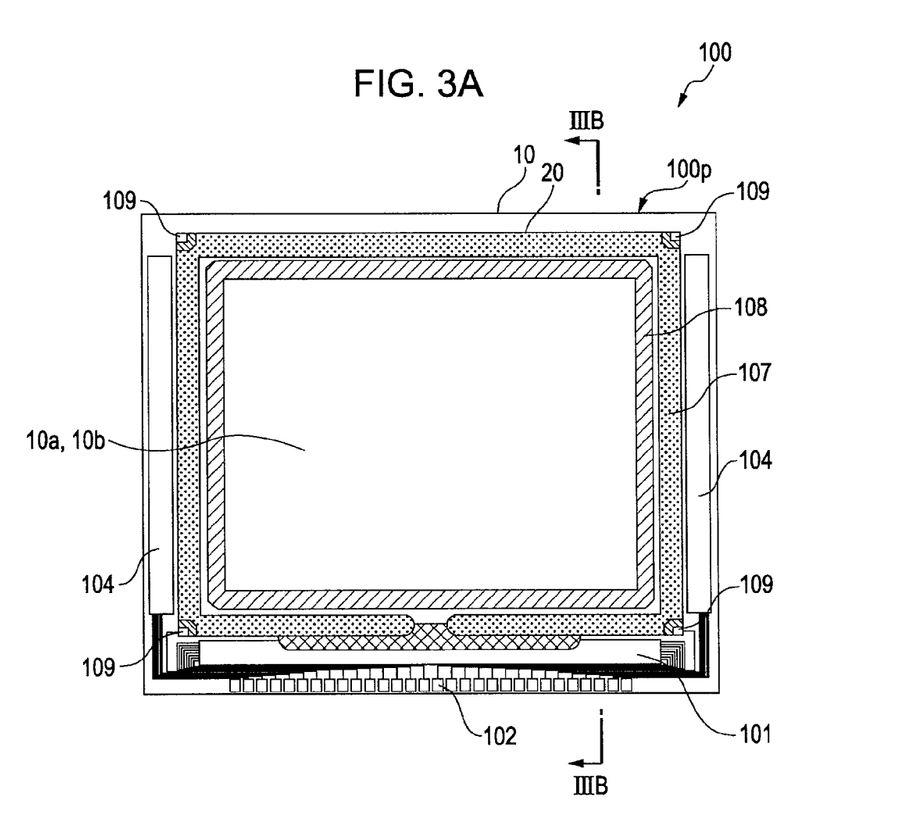
FIG. 3A is a plan view of an electro-optical device according to an embodiment of the invention together with constituent elements viewed from the opposing substrate side.
Figure 3B:
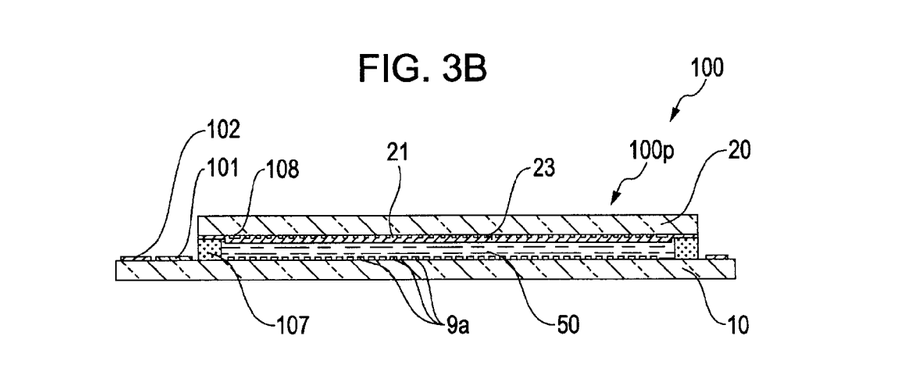
FIG. 3B is a cross-section view of the electro-optical device taken along line IIIB-IIIB shown in FIG. 3A.

FIG. 3A is a plan view of the liquid crystal panel 100p of the electro-optical device 100 according to an embodiment of the invention together with constituent elements viewed from the opposing substrate side, and FIG. 3B is a cross-section view of the electro-optical device taken along line IIIB-IIIB shown in FIG. 3A. As shown in FIGS. 3A and 3B, in the liquid crystal panel 100p of the electro-optical device 100, the component substrate 10 and the opposing substrate 20 are bonded together by a sealing member 107 with a predetermined gap interposed therebetween. In addition, the sealing member 107 is disposed along the edge of the opposing substrate 20. The sealing member 107 is an adhesive agent formed of a light curing resin, a thermo-setting resin, or the like. In the sealing member 107, a gap member such as a glass fiber or a glass bead is blended.

In the component substrate 10, in an area outside the sealing member 107, the data line driving circuit 101 and a plurality of terminals 102 are formed along one side of the component substrate 10. In addition, the scanning line driving circuit 104 is formed along two sides adjacent to the one side. At least one spot of a corner part of the opposing substrate 20, a vertical conduction member 109 that is used for implementing electrical conduction between the component substrate 10 and the opposing substrate 20 is formed.

To be described later in detail, in the component substrate 10, pixel electrodes 9a are formed in a matrix shape. On the other hand, in the opposing substrate 20, a frame 108 made of a light shielding material is formed in an area located on the inner side of the sealing member 107. The inner side of the frame is formed as an image display area 10a. In addition, in the opposing substrate 20, a light shielding film 23 called a black matrix (or a black stripe) or the like is formed in an area facing horizontal and vertical boundary areas of the pixel electrode 9a of the component substrate 10. In addition, on the upper side of the light shielding film, a color filter, a flattening film, an opposing electrode 21, and an alignment film, which will be described later, are formed. In the pixel array area 10b, a dummy pixel may be configured in an area overlapped with the frame 108. In such a case, an area of the pixel array area 10b except for the dummy pixel is used as the image display area 10a.

Although not shown in the figure, on the light incident side or light exit side of the opposing substrate 20 and the component substrate 10 of the electro-optical device 100, a polarizing film, a phase difference film, a polarization plate, and the like are disposed in a predetermined direction, depending on the type of a used liquid crystal 50, that is, an operation mode such as a TN (twisted nematic) mode or an STN (super TN) mode or a normally white mode/a normally black mode.

Configuration of Each Pixel

Figure 4A:
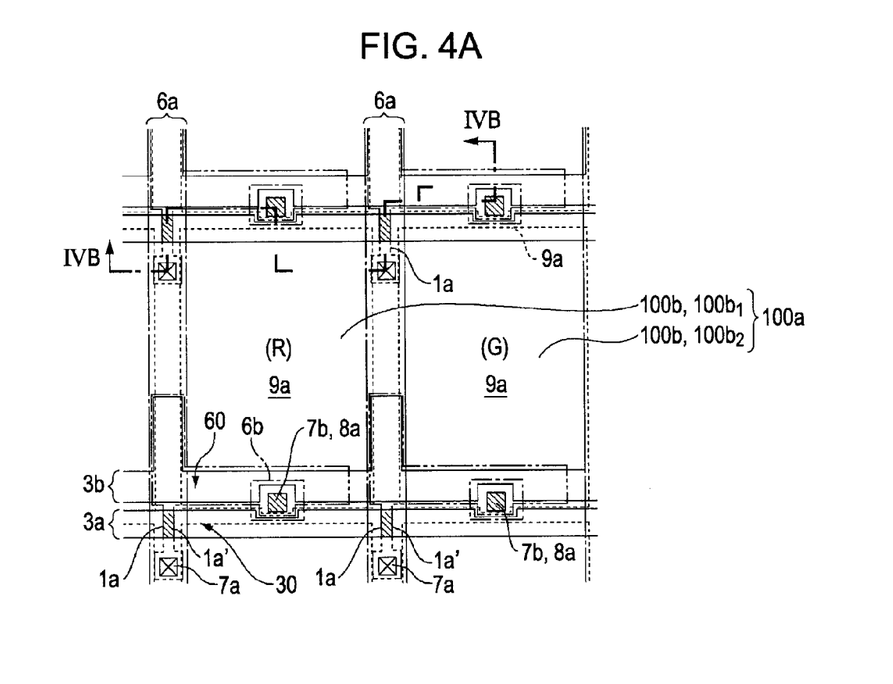
FIG. 4A is a plan view of adjacent pixels in a component substrate used in an electro-optical device according to an embodiment of the invention.
Figure 4B:
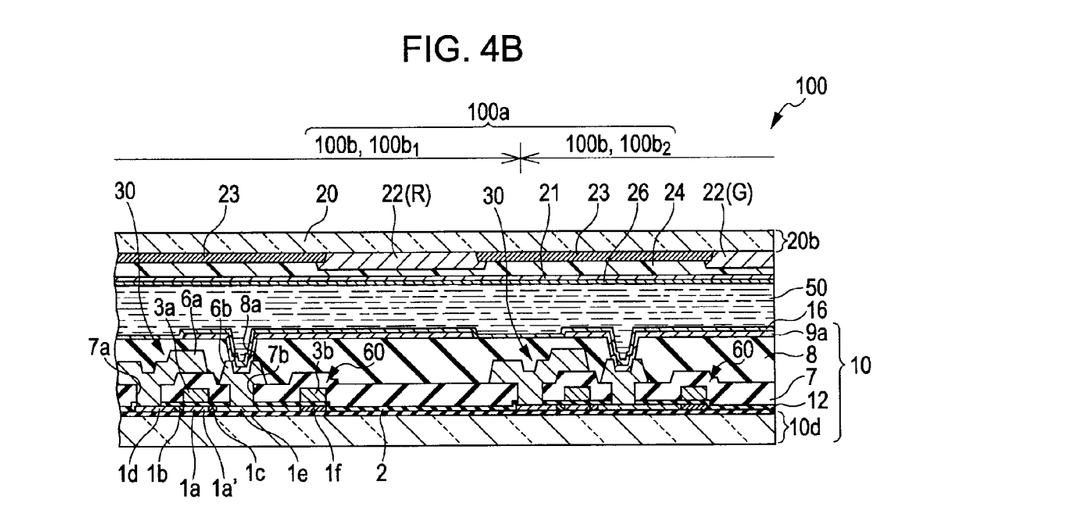
FIG. 4B is a cross-section view of the electro-optical device taken along line IVB-IVB shown in FIG. 4A.

FIG. 4A is a plan view of adjacent pixels in the component substrate 10 of the electro-optical device 100 according to an embodiment of the invention, and FIG. 4B is a cross-section view of the electro-optical device 100 taken along line IVB-IVB shown in FIG. 4A.

As shown in FIGS. 4A and 4B, in the component substrate 10, an underlying protection film 12 formed of a silicon dioxide film or the like is formed on the surface of a translucent substrate 10d formed of glass or the like, and a thin film transistor 30 of an N-channel type is formed in a position adjacent to the pixel electrode 9a on the surface side of the component substrate. The thin film transistor 30 has an LDD (Lightly Doped Drain) structure in which a channel forming region 1a', a lowly-doped source region 1b, a highly-doped source region 1d, a low-doped drain region 1c, and a highly-doped drain region 1e are formed in a semiconductor film 1a that has an island shape.

The semiconductor film 1a is a polysilicon film that is acquired by forming an amorphous silicon film in the component substrate 10 and then polycrystallizing the amorphous silicon film by laser anneal, lamp anneal, or the like. The lowly-doped source region 1b and the lowly-doped drain region 1c are semiconductor regions that are formed by introducing lowly-doped N-type impurity ions (phosphorous ions) at the dose amount of about $0.1 \times 10^{13}/cm^2$ to $10 \times 10^{13}/cm^2$ with the scanning line 3a used as a mask. In addition, the highly-doped source region 1d and the highly-doped drain region 1e are semiconductor regions that are formed by introducing highly-doped N-type impurity ions (phosphorous ions) at the dose amount of about $0.1 \times 10^{15}/cm^2$ to $10 \times 10^{15}/cm^2$ by using a resist mask.

On the upper layer side of the thin film transistor 30, interlayer insulation films 7 and 8 are formed. On the surface of the interlayer insulation film 7, a data line 6a is formed, and the data line 6a is electrically connected to the highly-doped source region 1d through a contact hole 7a formed on the interlayer insulation film 7. On the surface of the interlayer insulation film 8, a translucent pixel electrode 9a formed of an ITO (Indium Tin Oxide) film is formed. In addition, the pixel electrode 9a is electrically connected to the drain electrode 6b through a contact hole 8a formed in the interlayer insulation film 8. The drain electrode 6b is electrically connected to the high-doped drain region 1e through a contact hole 7b formed in the interlayer insulation film 7 and a gate insulation film 2. On the surface side of the pixel electrode 9a, an alignment film 16 formed of a polyimide film is formed. A hold capacitor 60 is configured in an installation part if (a lower electrode) extending from the highly-doped drain region 1e by disposing the scanning line 3a and the capacitor line 3b located on the same layer to face each other as upper electrodes through an insulation film (dielectric film) that is formed simultaneously with the gate insulation film 2. In this embodiment, the scanning line 3a and the capacitor line 3b are formed of a single-layered or multi-layered film such as a molybdenum film, an aluminum film, a titanium film, a tungsten film, or a tantalum film. In addition, the data line 6a and the drain electrode 6b are formed of a single-layered or multi-layered film such as a molybdenum film, an aluminum film, a titanium film, a tungsten film, or a tantalum film.

The component substrate 10 and the opposing substrate 20 which are configured as described above are disposed such that the pixel electrode 9a and the opposing electrode 21 face each other. In addition, between the component and opposing substrates 10 and 20, a liquid crystal 50 as an electro-optical material is sealed in a space surrounded by the sealing member 107 (see FIGS. 3A and 3B). The liquid crystal 50 is aligned in a predetermined direction by the alignment films 16 and 26 in a state that an electric field is not applied from the pixel electrode 9a. The liquid crystal 50 is, for example, formed of one type of nematic liquid crystals or a mixture of various types of nematic liquid crystals.

In the above-described electro-optical device 100, one sub pixel 100b is formed in correspondence with one pixel electrode 9a, and one pixel 100a is configured by two sub pixels 100b. In this embodiment, in any of the plurality of pixels 100a, one sub pixel (a first sub pixel $100b_1$) of two sub pixels 100b is a color sub pixel corresponding to red color (R), and the other sub pixel (a second sub pixel $100b_2$) is a color sub pixel corresponding to green color (G).

For configuring the above-described color sub pixels, in the opposing substrate 20, a light shielding film 23 that is called a black matrix (or a black stripe) or the like is formed in an area facing horizontal and vertical boundary areas of the pixel electrode 9a of the component substrate 10 on the surface of the translucent substrate 20b formed of glass or the like. In addition, on the upper layer of the light shielding film 23, color filters 22 (22(R) and 22(G)) of corresponding colors are formed. In this embodiment, regarding the two sub pixels 110b, a color filter 22(R) of red color (R) is formed in the first sub pixel $100b_1$, and a color filer 22(G) of green color (G) is formed in the second sub pixel $100b_2$. In addition, in an upper layer of the color filters 22, a flattening film 24 formed of a photo-sensitive resin, a translucent opposing electrode 21 formed of an ITO film, and an alignment film 26 are formed.

Color Arrangement

Figure 5:
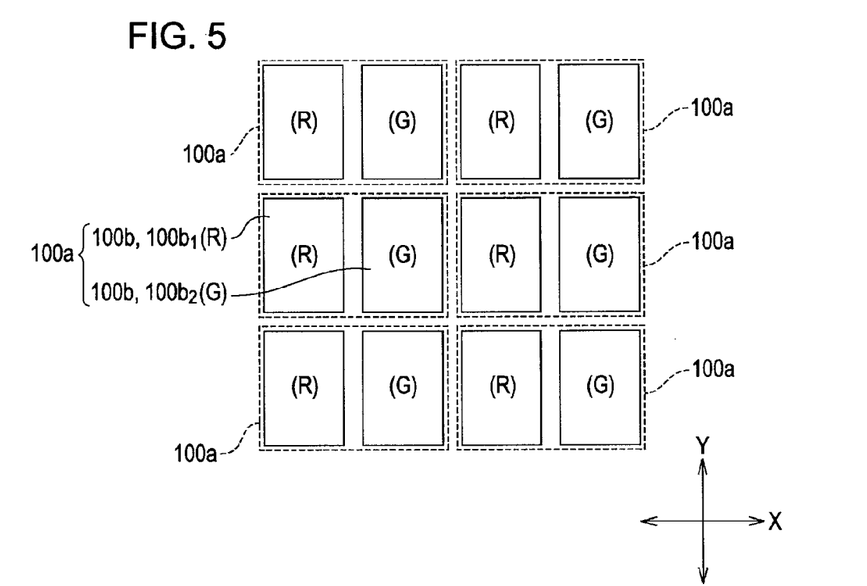
FIG. 5 is a diagram showing a two-dimensional arrangement of pixels (sub pixels) of an electro-optical device according to Embodiment 1 of the invention.

FIG. 5 is a diagram showing a two-dimensional arrangement of pixels (sub pixels) of the electro-optical device 100 according to an embodiment of the invention.

As shown in FIG. 5, a stripe arrangement is employed as the color arrangement of the electro-optical device 100 according to this embodiment. Accordingly, when directions perpendicular to each other are set as a first direction X (a direction in which the scanning line 3a extends) and a second direction Y (a direction in which the data line 6a extends), among the plurality of pixels 100a, in the pixels 100a aligned along the first direction X, a first sub pixel $100b_1$ and a second sub pixel $100b_2$ are alternately disposed. In addition, in pixels adjacent in the second direction Y, positions of the first and second sub pixels $100b_1$ and $100b_2$ in the first direction X coincide with each other. In other words, a plurality of pixel arrays in which a first sub pixel $100b_1$ and a second sub pixel $100b_2$ are alternately disposed along the first direction X is disposed, and in pixel arrays adjacent to each other in the second direction Y, positions of the first and second sub pixels in the first direction coincide with each other. In addition, in any of the plurality of pixels 100a, the first sub pixel $100b_1$ and the second sub pixel $100b_2$ have a same size.

When the above-described electro-optical device 100 is used in the head-up display 1000 shown in FIG. 1, display in red color (R) by using the first sub pixel $100b_1$, display in green color (G) by using the second sub pixel $100b_2$, and display in yellow color by using both the first sub pixel $100b_1$ and the second sub pixel $100b_2$ can be made. The number of the above-described colors is sufficient for simple navigation display, speed display, and the like of the head-up display 1000.

In addition, according to this embodiment, since each pixel 100a is configured by two sub pixels 100b, the ratio of an area occupied by the thin film transistors 30 and wirings within one pixel 100a to the area of one pixel is smaller than that of the pixel described with reference to FIG. 11, and thereby the aperture ratio of the pixel is high. In other words, when one pixel is configured by three sub pixels, three thin film transistors 30 and two data lines 6a are formed within one pixel. However, in this embodiment, since one pixel 100a is configured by two sub pixels 100b, only two thin film transistors 30 and one data line 6a are formed within one pixel 100a, and thereby an area through which display light is transmitted is larger than that of the pixel shown in FIG. 11. Therefore, according to this embodiment, an image having high luminance can be displayed.

Embodiment 2

Figure 6:
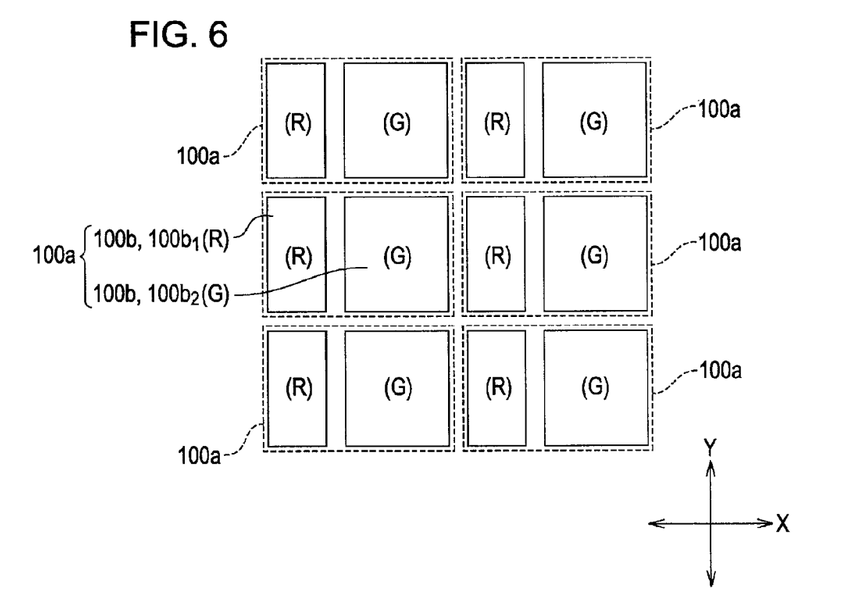
FIG. 6 is a diagram showing a two-dimensional arrangement of pixels (sub pixels) of an electro-optical device according to Embodiment 2 of the invention.

FIG. 6 is a diagram showing a two-dimensional arrangement of pixels (sub pixels) of an electro-optical device 100 according to Embodiment 2 of the invention. Since a basic configuration of this embodiment is the same as that of Embodiment 1, a same reference sign is attached to a part common to Embodiment 1, and a description thereof is omitted here.

As shown in FIG. 6, in the electro-optical device 100 according to this embodiment, one pixel 100a is also configured by two sub pixels 100b. In this embodiment, in any of the plurality of pixels 100a, one sub pixel (a first sub pixel $100b_1$) of the two sub pixels 100b is a color sub pixel corresponding to red color (R), and the other sub pixel (a second sub pixel $100b_2$) is a color sub pixel corresponding to green color (G).

In addition, a stripe arrangement is employed as the color arrangement of the electro-optical device 100 according to this embodiment. Accordingly, when directions perpendicular to each other are set as a first direction X and a second direction Y, among the plurality of pixels 100a, in the pixels 100a aligned along the first direction X, a first sub pixel $100b_1$ and a second sub pixel $100b_2$ are alternately disposed. In addition, in pixels adjacent in the second direction Y, positions of the first and second sub pixels $100b_1$ and $100b_2$ in the first direction X coincide with each other. In other words, a plurality of pixel arrays in which a first sub pixel $100b_1$ and a second sub pixel $100b_2$ are alternately disposed along the first direction X is disposed, and in pixel arrays adjacent to each other in the second direction Y, positions of the first and second sub pixels in the first direction coincide with each other.

Here, in any of the plurality of pixels 100a, the first sub pixel $100b_1$ and the second sub pixel $100b_2$ have different sizes. The size of the second sub pixel $100b_2$ corresponding to green color (G) is about twice that of the first sub pixel $100b_1$ corresponding to red color (R).

Major Advantages of Embodiment 2

When the above-described electro-optical device 100 is used in the head-up display 1000 shown in FIG. 1, as in Embodiment 1, display in red color (R) by using the first sub pixel $100b_1$, display in green color (G) by using the second sub pixel $100b_2$, and display in yellow color by using both the first sub pixel $100b_1$ and the second sub pixel $100b_2$ can be made. The number of the above-described colors is sufficient for simple navigation display, speed display, and the like of the head-up display 1000. In addition, according to this embodiment, since each pixel 100a is configured by two sub pixels 100b, the ratio of an area occupied by the thin film transistors 30 and wirings within one pixel 100a to the area of one pixel is smaller than that of the pixel described with reference to FIG. 11, and thereby the aperture ratio of the pixel is high. Therefore, an image having high luminance can be displayed. In addition, when areas of the first sub pixel $100b_1$ and the second sub pixel $100b_2$ are configured to be the same as those in a case where the number of sub pixels configuring each pixel is three, the area of one pixel can be configured to be two thirds of that in the case where the number of the sub pixels configuring each pixel is three, and accordingly, the overall size of the electro-optical device 100 can be minimized. On the contrary, when the overall size of the electro-optical device 100 is not changed, the area of one pixel becomes two thirds of that in the case where the number of the sub pixels configuring each pixel is three. Accordingly, in such a case, the total number of pixels can be increased by disposing more pixels, and thereby precision of the electro-optical device can be increased.

In addition, since the number of sub pixels configuring each pixel is two, the configuration of the data line driving circuit 101 that drives the electro-optical device 100 can be simplified, compared to a case where the number of sub pixels configuring each pixel is three. In particular, the overall size of the electro-optical device 100 can be decreased by decreasing the area occupied by the data line driving circuit 101. In addition, only two data lines 6a are needed to be controlled for controlling one pixel, and accordingly, a control operation for the data lines can be performed in an easy manner, compared to a case where three data lines 6a are controlled for controlling one pixel.

In addition, the size of the second sub pixel $100b_2$ corresponding to green color (G) that has low visibility of the red color (R) and green color (G) is configured to be larger than that of the first sub pixel $100b_1$ corresponding to red color (R). Accordingly, there is an advantage that a part displayed in green color (G) can be visually recognized in an easy manner. When a sub pixel having an area larger than that of the sub pixel in a case where the number of sub pixels configuring each pixel is three is included, a time period for applying a voltage is needed to be lengthened for driving the large sub pixel, compared to a case where only ordinary-size pixels are included.

Embodiment 3

Figure 7:
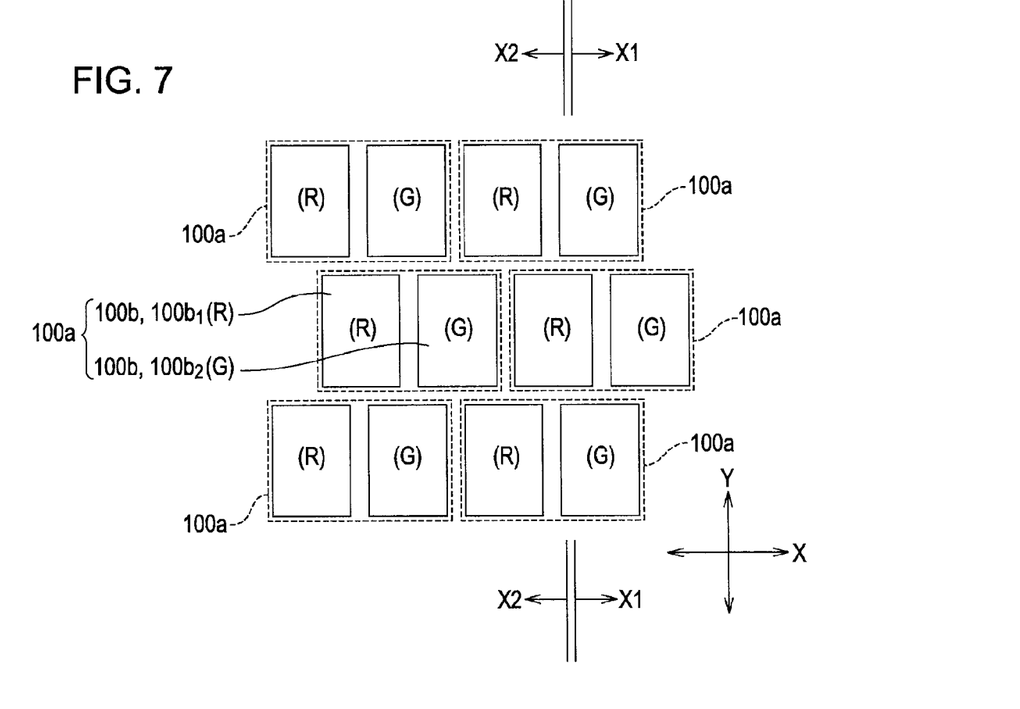
FIG. 7 is a diagram showing a two-dimensional arrangement of pixels (sub pixels) of an electro-optical device according to Embodiment 3 of the invention.

FIG. 7 is a diagram showing a two-dimensional arrangement of pixels (sub pixels) of an electro-optical device 100 according to Embodiment 3 of the invention. Since a basic configuration of this embodiment is the same as that of Embodiment 1, a same reference sign is attached to a part common to Embodiment 1, and a description thereof is omitted here.

As shown in FIG. 7, in the electro-optical device 100 according to this embodiment, one pixel 100a is also configured by two sub pixels 100b. In this embodiment, in any of the plurality of pixels 100a, one sub pixel (a first sub pixel $100b_1$) of the two sub pixels 100b is a color sub pixel corresponding to red color (R), and the other sub pixel (a second sub pixel $100b_2$) is a color sub pixel corresponding to green color (G). In addition, in any of the plurality of pixels 100a, the first sub pixel $100b_1$ and the second sub pixel $100b_2$ have a same size.

Here, a delta arrangement is employed as color arrangement of the electro-optical device 100 according to this embodiment. Accordingly, when directions perpendicular to each other are set as a first direction X and a second direction Y, among the plurality of pixels 100*a*, in the pixels 100*a* aligned along the first direction X, a first sub pixel 100$b_1$ and a second sub pixel 100$b_2$ are alternately disposed. In addition, in pixels adjacent in the second direction Y, positions of the first and second sub pixels 100$b_1$ and 100$b_2$ in the first direction X are deviated from each other. In other words, a plurality of pixel arrays in which a first sub pixel and a second sub pixel are alternately disposed along the first direction X is disposed, and in pixel arrays adjacent to each other in the second direction Y, positions of the first and second sub pixels in the first direction are deviated from each other. According to this embodiment, in the pixels of pixel arrays adjacent in the second direction Y, the positions of the first and second sub pixels 100$b_1$ and 100$b_2$ are deviated from each other in the first direction X by a dimension corresponding to ½ of the pixel pitch.

When the above-described electro-optical device 100 is used in the head-up display 1000 shown in FIG. 1, as in Embodiment 1, display in red color (R) by using the first sub pixel 100$b_1$, display in green color (G) by using the second sub pixel 100$b_2$, and display in yellow color by using both the first sub pixel 100$b_1$ and the second sub pixel 100$b_2$ can be made. The number of the above-described colors is sufficient for simple navigation display, speed display, and the like of the head-up display 1000. In addition, according to this embodiment, since each pixel 100*a* is configured by two sub pixels 100*b*, the ratio of an area occupied by the thin film transistors 30 and wirings within one pixel 100*a* to the area of one pixel is smaller than that of the pixel described with reference to FIG. 11, and thereby the aperture ratio of the pixel is high. Therefore, an image having high luminance can be displayed.

In addition, in a case where a cover is provided in the electro-optical device 100 or the like, for example, when a side denoted by arrow X1 is covered with the cover and an image is displayed only on a side denoted by arrow X2, there is a case that a line of green color (G) or the like is displayed in the end part of the image in a case where the stripe arrangement shown in FIG. 5 or 6 is used. However, according to this embodiment, it can be prevented that such a line is displayed.

Modified Examples of Embodiments 1 to 3

In the above-described Embodiments 1 to 3, one sub pixel (a first sub pixel 100$b_1$) of the two sub pixels 100*b* is a color sub pixel corresponding to red color (R), and the other sub pixel (a second sub pixel 100$b_2$) is a color sub pixel corresponding to green color (G). However, a combination of different colors, for example, a combination of red color (R) and blue color (B) or a combination of green color (G) and blue color (B) may be used. In addition, in the embodiment shown in FIG. 6, the size of the second sub pixel 100$b_2$ corresponding to green color (G) of the red color (R) and green color (G) is configured to be larger than that of the first sub pixel 100$b_1$ corresponding to red color (R). However, a configuration in which the size of the first sub pixel 100$b_1$ corresponding to red color (R) is larger than that of the second sub pixel 100$b_2$ corresponding to green color (G) may be used. In addition, the configuration shown in FIG. 7, as the configuration shown in FIG. 6, may be applied to a case where the sizes of the first and second sub pixels 100$b_1$ and 100$b_2$ are different from each other.

Embodiment 4

Figure 8:
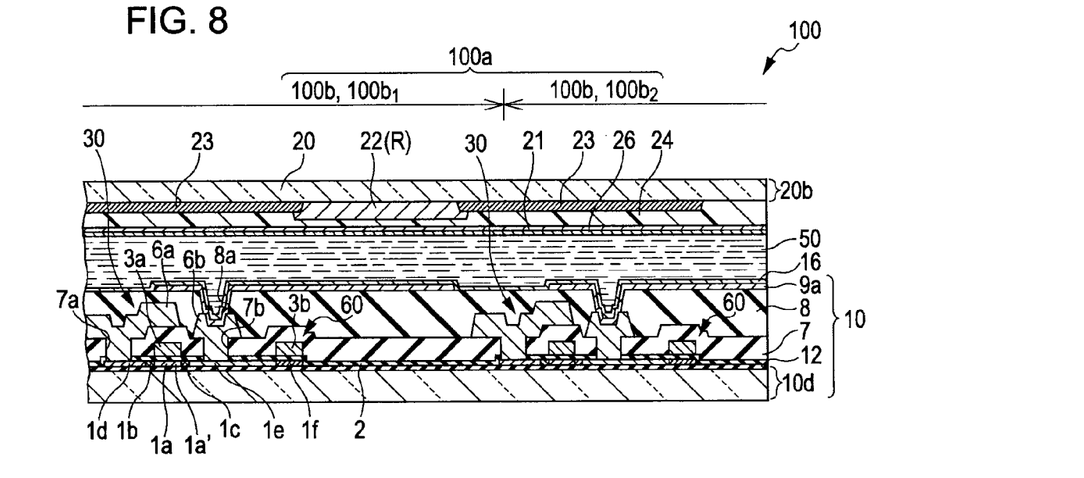
FIG. 8 is a cross-sectional view of an electro-optical device according to Embodiment 4 of the invention which is taken along line IVB-IVB shown in FIG. 4A.
Figure 9A:
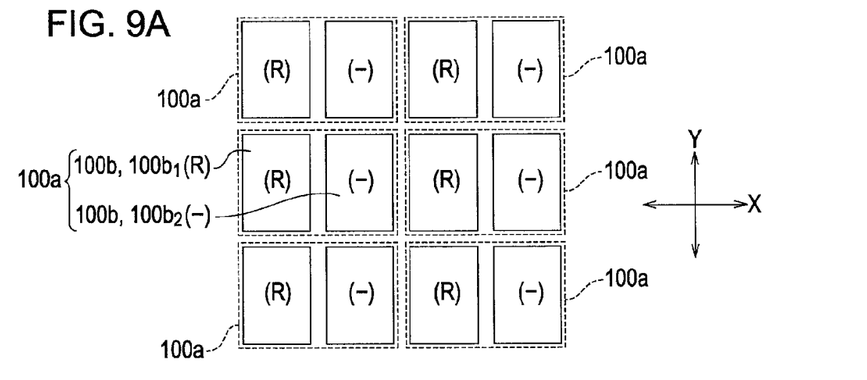
FIG. 9A is a diagram showing a two-dimensional arrangement of pixels (sub pixels) of an electro-optical device 100 according to Embodiment 4 of the invention.
Figure 9B:
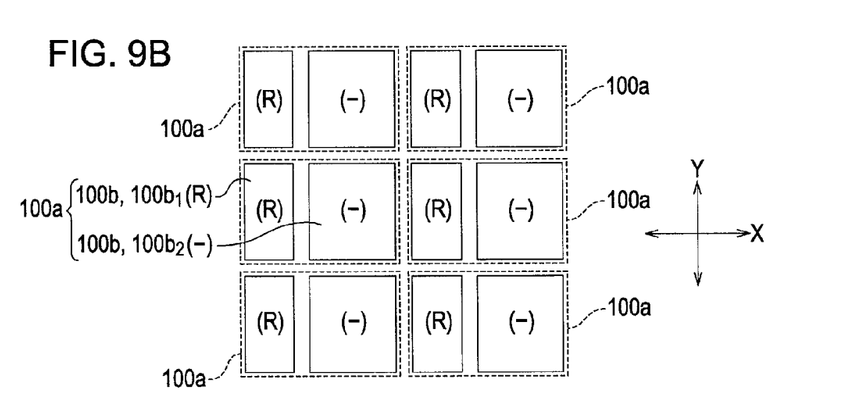
FIG. 9B is a diagram showing a two-dimensional arrangement of pixels (sub pixels) according to a modified example of Embodiment 4.
Figure 9C:
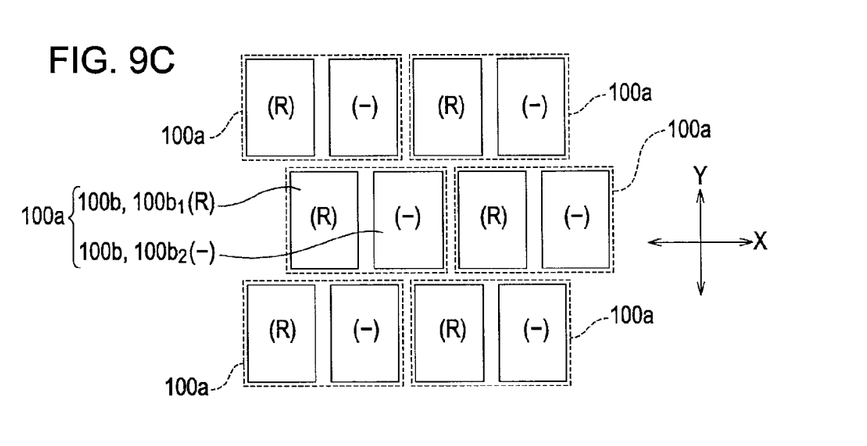
FIG. 9C is a diagram showing a two-dimensional arrangement of pixels (sub pixels) according to another modified example of Embodiment 4.

FIG. 8 is a cross-sectional view of an electro-optical device 100 according to Embodiment 4 of the invention in a case where the electro-optical device 100 is cut along line IVB-IVB shown in FIG. 4A. FIG. 9A is a diagram showing a two-dimensional arrangement of pixels (sub pixels) of the electro-optical device 100 according to Embodiment 4 of the invention, FIG. 9B is a diagram showing a two-dimensional arrangement of pixels (sub pixels) according to a modified example thereof, and FIG. 9C is a diagram showing a two-dimensional arrangement of pixels (sub pixels) according to another modified example thereof. Since a basic configuration of this embodiment is the same as that of Embodiment 1, a same reference sign is attached to a part common to Embodiment 1, and a description thereof is omitted here.

According to Embodiments 1 to 3, in the first sub pixel 100$b_1$ of the two sub pixels 100*b* included in one pixel 100*a*, a color filter 22(R) of red color (R) is formed, and in the second sub pixel 100$b_2$, a color filter 22(G) of green color (G) is formed. However, as shown in FIGS. 8 and 9A, according to this embodiment, although a color filter 22(R) of red color (R) is formed in the first sub pixel 100$b_1$, a color filter 22(G) is not formed in the second sub pixel 100$b_2$. Accordingly, the second sub pixel 100$b_2$ is configured as a monochrome sub pixel that emits white light.

In the above-described electro-optical device 100, an arrangement that is the same as the stripe arrangement is employed. Accordingly, when directions perpendicular to each other are set as a first direction X and a second direction Y, among the plurality of pixels 100*a*, in the pixels 100*a* aligned along the first direction X, a first sub pixel 100$b_1$ and a second sub pixel 100$b_2$ are alternately disposed. In addition, in pixels adjacent in the second direction Y, positions of the first and second sub pixels 100$b_1$ and 100$b_2$ in the first direction X coincide with each other. In other words, a plurality of pixel arrays in which a first sub pixel 100$b_1$ and a second sub pixel 100$b_2$ are alternately disposed along the first direction X is disposed, and in pixel arrays adjacent to each other in the second direction Y, positions of the first and second sub pixels in the first direction coincide with each other. In addition, in any of the plurality of pixels 100*a*, the first sub pixel 100$b_1$ and the second sub pixel 100$b_2$ have a same size.

When the above-described electro-optical device 100 is used in the head-up display 1000 shown in FIG. 1, monochrome display by using the second sub pixel 100$b_2$ and warning display in red color (G) by using the first sub pixel 100$b_1$ can be performed. In addition, the electro-optical device is sufficient to be used as night vision in the head-up display 1000.

In addition, according to this embodiment, since each pixel 100*a* is configured by two sub pixels 100*b*, the ratio of an area occupied by the thin film transistors 30 and wirings within one pixel 100*a* to the area of one pixel is smaller than that of the pixel described with reference to FIG. 11, and thereby the aperture ratio of the pixel is high. Therefore, according to this embodiment, an image having high luminance can be displayed.

In addition, in Embodiment 4, as shown in FIG. 9B, the size of the second sub pixel 100$b_2$, which is used for monochrome display, of the first and second sub pixels 100$b_1$ and 100$b_2$ may be configured to be larger than that of the first sub pixel 100$b_1$ corresponding to red color (R). Although not shown in the figure, the size of the first sub pixel 100$b_1$ corresponding to red color (R) may be configured to be larger than that of the second sub pixel 100$b_2$ that is used for monochrome display.

In Embodiment 4, as shown in FIG. 9C, among the plurality of pixels 100*a*, in the pixels 100*a* aligned along the first direction X, a first sub pixel 100$b_1$ and a second sub pixel 100$b_2$ may be alternately disposed. In addition, in pixels adjacent in the second direction Y, positions of the first and second sub pixels $100b_1$ and $100b_2$ in the first direction X may be deviated from each other. In other words, a configuration in which a plurality of pixel arrays, in which a first sub pixel and a second sub pixel are alternately disposed along the first direction X, is disposed, and in pixel arrays adjacent to each other in the second direction Y, positions of the first and second sub pixels in the first direction are deviated from each other may be used.

In addition, although a combination of the first sub pixel $100b_1$ corresponding to red color (R) and the second sub pixel $100b_2$ that is used for monochrome display is used in this embodiment, another color may be associated with the first sub pixel $100b_1$.

Other Embodiments

In the above-described embodiments, a poly-silicon film is used as a semiconductor film, as an example. However, the present invention may be applied to a component substrate 10 using an amorphous silicon film or a single-crystal silicon layer. In addition, the present invention may be applied to a liquid crystal device using a thin film diode element (non-linear element) as a pixel switching element.

In addition, in the above-described embodiments, the present invention is applied to a liquid crystal device (electro-optical device) of a TN (Twisted Nematic) mode. However, the present invention may be applied to a liquid crystal device (electro-optical device) of a fringe field switching (FFS) mode, an in-plane switching (IPS) mode, or the like that drives the liquid crystal by using a horizontal electric field.

In addition, in the above-described embodiments, a liquid crystal device has been described as an example of the electro-optical device. However, the present invention may be applied to an electro-optical device such as an organic electroluminescence device that uses an electro-optical material other than the liquid crystal. In such a case, the electro-optical material is not needed to be maintained between the component substrate and the opposing substrate. The electro-optical material may be configured to be maintained in the component substrate. In such a case, a color filter is disposed in a region corresponding to at least one of the first sub pixel $100b_1$ and the second sub pixel $100b_2$, as is needed.

Although, not mentioned in the above-described embodiments, it is preferable that the first and second sub pixels $100b_1$ and $100b_2$ are driven to have two gray scale levels of On/Off. In a head-up display or the like, first of all, display visually recognizable in an easy manner is required, and accordingly, there are many cases that complex display such as display using multiple gray-scale levels is not needed. Accordingly, a driving circuit and a control operation that are used for complicated gray scale display can be omitted, and the driving circuit can be more simplified.

Figure 12:
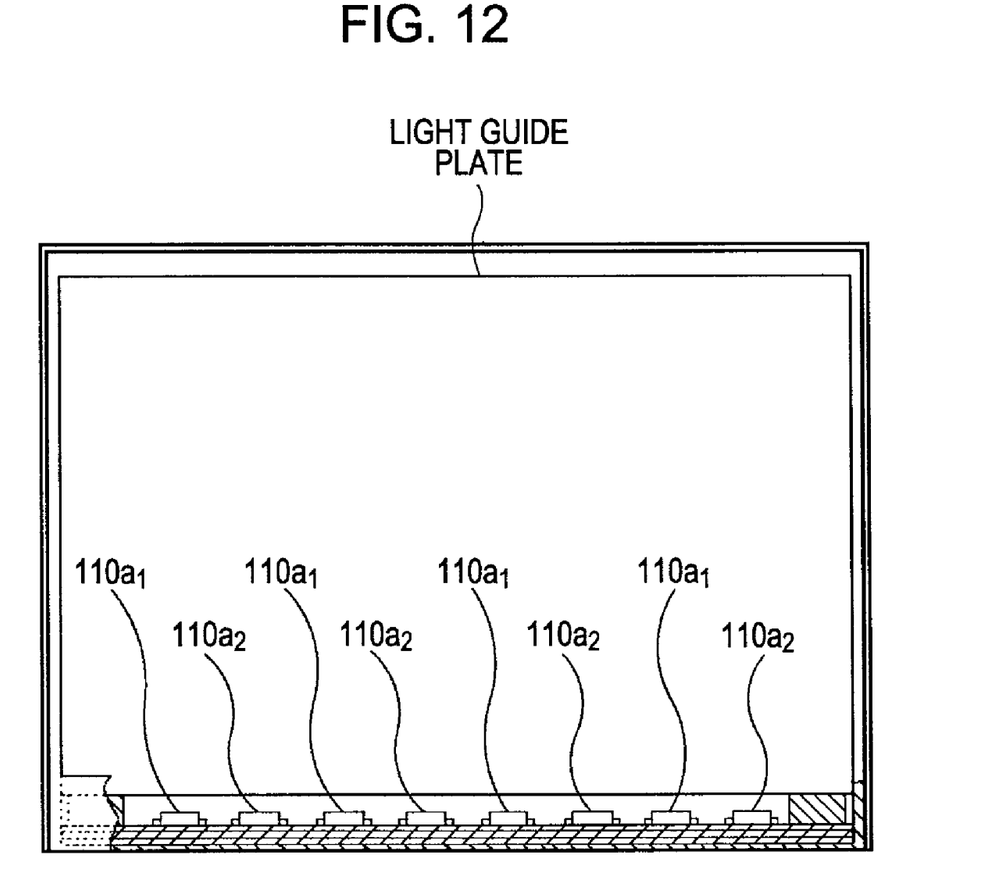
FIG. 12 is a diagram showing a back light device used in an electro-optical device according to an embodiment of the invention.

In the above-described embodiments, it is preferable that the electro-optical device further includes a back light device 110 as shown in FIG. 1 and the back light device 110 has a first light source $110a_1$ that emits light of a same color as that of the first sub pixel $100b_1$ as shown in FIG. 12 and a second light source $110a_2$ that emits light of a same color as that of the second sub pixel $100b_2$, as its light sources. Since the back light device 110 emits light of same colors as those of the sub pixels, that is, the back light device emits only light of needed colors, the use efficiency of light is improved, and accordingly, display with high brightness can be performed.

In addition, it is preferable that the first light source $110a_1$ and the second light source $110a_2$ are LEDs and the numbers of the first and second light sources $110a_1$ and $110a_2$ to be turned on are set to be different from each other. For example, when the first sub pixel $100b_1$ of the first and second sub pixels $100b_1$ and $100b_2$ is needed to be displayed brighter, the first sub pixel $100b_1$ can be displayed brighter by configuring the number of the turned-on first light sources $110a_1$ to be larger than that of the turned-on second light sources $110a_2$. In such a case, when the first sub pixel $100b_1$ is needed to be displayed brighter than the second sub pixel all the time, it can be implemented by disposing and turning on the first light sources $110a_1$ of a number larger than that of the second light sources $100a_2$. In addition, when it is needed that brightness levels of the first and second sub pixels $100b_1$ and $100b_2$ are normally equivalent to each other and the first sub pixel $100b_1$ is needed to be brightened based on the content of display, it may be implemented by turning on the same numbers of the first light sources $110a_1$ and the second light sources $110a_2$ and increasing the number of the turned-on first light sources $110a_1$ in a case where the first sub pixel $100b_1$ is needed to be brightened. In addition, values of currents flowing through the first light source $110a_1$ and the second light source, which are LEDs, may be configured to be different from each other. In such a case, instead of disposing same numbers of the first light sources $110a_1$ and the second light sources $110a_2$ and increasing or decreasing the number of light sources to be turned on, the brightness levels of the first and second light sources $110a_1$ and $110a_2$ may be controlled by controlling the currents for light sources to be turned on. For example, when the first sub pixel $100b_1$ is needed to be brightened, the first sub pixel $100b_1$ can be brightened by controlling the current flowing through the first light source $110a_1$ to increase. In addition, both the number of light sources and the currents flowing though the light sources may be controlled. In order to brighten the first sub pixel $100b_1$, the size of the first sub pixel $100b_1$ may be considered to be configured larger than that of the second sub pixel $100b_2$. However, in such a case, a control operation by using the driving circuit is needed. However, by using the above-described configuration, the first sub pixel can be brightened by only controlling the number of light sources to be turned on. In the back light device 110 shown in FIG. 12, LEDs are disposed on the side of a light guide plate. However, even a under-disposition-type back light device in which LEDs are disposed right under the rear face of the electro-optical device can be controlled by the number of LEDs to be turned on or the current values, similarly.

Example of Mounting Electro-optical Device on Electronic Apparatus

Figure 10A:
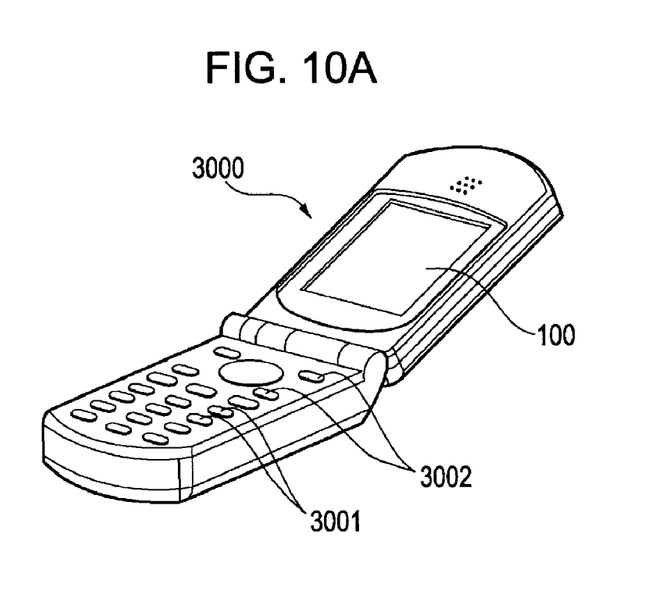
FIGS. 10A and 10B are diagrams of electronic apparatuses using an electro-optical device according to an embodiment of the invention.
Figure 10B:
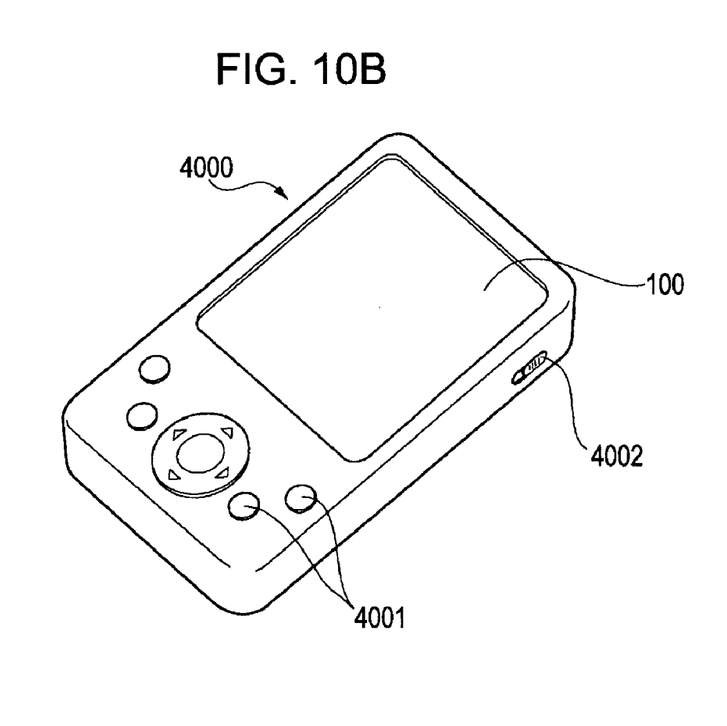

Next, an electronic apparatus to which the electro-optical device 100 according to the above-described embodiment is applied will be described. FIG. 10A shows the configuration of a cellular phone having the electro-optical device 100. The cellular phone 3000 includes a plurality of operation buttons 3001, a scroll button 3002, and the electro-optical device 100 as a display unit. By operating the scroll button 3002, a screen displayed in the electro-optical device 100 is scrolled. FIG. 10B shows the configuration of a personal digital assistant (PDA) to which the electro-optical device 100 is applied. The personal digital assistant 4000 includes a plurality of operation buttons 4001, a power switch 4002, and the electro-optical device 100 as a display unit. When the power switch 4002 is operated, various types of information such as an address list or a schedule note is displayed in the electro-optical device 100.

In addition, as examples of electronic apparatuses to which the electro-optical device 100 is applied, there are a pager, an electronic organizer, a calculator, a POS terminal, an apparatus having a touch panel, and the like, in addition to the apparatuses shown in FIG. 10. As a display unit of the above-described various apparatuses, the above-described electro-optical device 100 may be used.

What is claimed is:

1. An electro-optical device comprising:
    a first sub pixel; and
    a second sub pixel,
    wherein a pixel is adapted to be configured by the first sub pixel and the second sub pixel only, and
    the first sub pixel and the second sub pixel are adapted to emit light of different colors.

2. The electro-optical device according to claim 1, wherein the first sub pixel and the second sub pixel are color sub pixels.

3. The electro-optical device according to claim 1, wherein at least one of the first sub pixel and the second sub pixel is a monochrome sub pixel that is adapted to emit white light.

4. The electro-optical device according to claim 1, wherein the first sub pixel and the second sub pixel have a same size.

5. The electro-optical device according to claim 1, wherein the first sub pixel and the second sub pixel have different sizes.

6. The electro-optical device according to claim 1, further comprising
    a plurality of pixel arrays in which a plurality of the first sub pixels and a plurality of the second sub pixels are alternately disposed along a first direction, and in pixel arrays adjacent in a second direction, positions of the first sub pixel and the second sub pixel in the first direction are deviated from each other, wherein the first direction is perpendicular to the second direction.

7. The electro-optical device according to claim 1, further comprising:
    a component substrate in which the sub pixels are formed; and
    an electro-optical material that is maintained in the component substrate,
    wherein a color filter is disposed in an area corresponding to at least one of the first sub pixel or the second sub pixel.

8. The electro-optical device according to claim 1, wherein the first sub pixel and the second sub pixel are driven to have two different gray scale levels.

9. The electro-optical device according to claim 1, further comprising a back light,
    wherein light sources of the back light include a first light source that is adapted to emit light of a same color as that of the first sub pixel and a second light source that is adapted to emit light of a same color as that of the second sub pixel.

10. The electro-optical device according to claim 1, further comprising a back light,
    wherein the back light includes a first light source and a second light source, the first light source and the second light source being LEDs, and
    wherein the numbers of the first light sources to be turned on and the second light sources to be turned on are different from each other.

11. The electro-optical device according to claim 1, further comprising a back light,
    wherein the back light includes a first light source and a second light source, the first light source and the second light source being LEDs, and
    wherein the first light source and the second light source are adapted to be driven by different amounts of current from each other.

12. An electronic apparatus comprising the electro-optical device according to claim 1.

13. The electronic apparatus according to claim 12, further comprising:
    a light source that supplies light to the electro-optical device; and
    an optical system that adapted to project display light that is formed by optically modulating the light emitted from the light source by using the electro-optical device toward a projection surface.

* * * * *